United States Patent [19]
Miller et al.

[11] Patent Number: 6,124,571
[45] Date of Patent: Sep. 26, 2000

[54] METHOD FOR HEATING A SOLID SURFACE SUCH AS A FLOOR, WALL, ROOF, OR COUNTERTOP SURFACE

[76] Inventors: Charles G. Miller, 23 Thimble Farms Rd., Branford, Conn. 06405; John A. Rolls, 4 Frog Rock Rd., Armonk, N.Y. 10504; Otis H. Hastings, 130 Crescent Rd., Mahwah, N.J. 07430

[21] Appl. No.: 09/457,054

[22] Filed: Dec. 7, 1999

Related U.S. Application Data

[60] Continuation of application No. 09/311,219, May 13, 1999, Pat. No. 6,015,965, which is a division of application No. 08/633,965, Apr. 19, 1996, Pat. No. 5,932,124.

[51] Int. Cl.[7] .............................. H05B 1/00; C09K 3/118
[52] U.S. Cl. .............................................. 219/213; 252/70
[58] Field of Search ...................................... 219/213, 218, 219/220, 528, 544, 298; 312/111; 252/70

[56] References Cited

U.S. PATENT DOCUMENTS

| | | | |
|---|---|---|---|
| 4,878,332 | 11/1989 | Drake | 52/741 |
| 4,899,031 | 2/1990 | Dyer | 219/213 |
| 4,942,078 | 7/1990 | Newman et al. | 428/192 |
| 4,972,197 | 11/1990 | McCauley et al. | 343/704 |
| 4,990,747 | 2/1991 | Konda | 392/435 |
| 5,250,228 | 10/1993 | Baigrie et al. | 252/511 |
| 5,344,696 | 9/1994 | Hastings et al. | 428/220 |
| 5,361,183 | 11/1994 | Wiese | 361/42 |
| 5,528,249 | 6/1996 | Gafford et al. | 343/704 |

*Primary Examiner*—Teresa Walberg
*Assistant Examiner*—Daniel Robinson

[57] ABSTRACT

A method is provided for heating the surface of a material such as a floor, wall, roof, or countertop. The method comprises providing a laminated heater element, disposing the heater element at a predetermined depth in the material and energizing the element at prescribed intervals and temperatures which are effective to heat the surface of the material.

2 Claims, 6 Drawing Sheets

METHOD FOR HEATING A SOLID SURFACE SUCH AS A FLOOR, WALL, ROOF, OR COUNTERTOP SURFACE

This application is a continuation of application Ser. No. 09/311,219, filed May 13, 1999, now U.S. Pat. No. 6,015,965, which is a divisional of application Ser. No. 09/633,965, filed Apr. 19, 1996 now U.S. Pat. No. 5,932,124, issued Aug. 3, 1999.

BACKGROUND OF THE INVENTION

1. Field of the Invention

The present invention generally relates to methods of heating various solid surfaces. Specifically, the invention relates to methods of heating floors, walls, roofs, or countertops by applying a heater element, such as a laminated composite heater element to the particular surface and energizing the heater element.

2. Description of the Prior Art

A variety of heater elements exist in the prior art. U.S. Pat. No. 4,534,886, to Kraus et al., discloses an electrically conductive web composed of a non-woven sheet of conductive fibers and non-conductive fibers. The sheet is saturated with a dispersion containing conductive particles and is then dried. The Kraus et al. heater element is used primarily in heating pads.

International Application No. PCT/US94/13504 (Publication No. WO95/15670) discloses an electrically conductive composite heating assembly. The assembly has an electrically conductive non-woven fiber layer laminated between layers of fiberglass and other dielectric material. The assembly further has an abrasion resistant outer layer. The heater element is used on aerospace structures as an ice protection system to withstand the repeated mechanical stress and thermal cycles encountered in extremely harsh aerospace environments.

U.S. Pat. No. 5,344,696 to Hastings et al. discloses an integrally bonded laminate that is used to thermally control a surface of an aircraft to which the laminate is bonded.

None of the prior art heater elements, however, have been successfully applied to floors, walls, roofs, or countertops.

SUMMARY OF THE INVENTION

The present invention comprises a method for heating the surface of a solid material, such as a floor, wall, roof, or countertop. The method comprises providing a heater element, disposing the heater element at a predetermined depth in the material, and energizing the heater element at prescribed intervals and temperatures, effective to heat the surface of the material.

DETAILED DESCRIPTION OF THE PREFERRED EMBODIMENT

The present invention comprises a method for heating the surface of a solid material, such as a floor, wall, roof, or countertop. The method comprises providing a heater element, disposing the heater element at a predetermined depth and location in the material and energizing the element at prescribed intervals and temperatures which are effective to heat surface of the material.

The heater element of the present invention is a laminated composite, impermeable to water, and is of the type disclosed in U.S. Pat. No. 5,344,696 (Hastings et al.), which is incorporated herein by reference. As disclosed in the Hastings et al. patent, the heater element comprises a durable outer ply, which is resistant to abrasion and impermeable to water, bonded to and through a conductive layer of fibers, and an integrally enveloping adhesive, which is adhered to the surface of a vessel. The conductive layer is connected to a source of electrical energy, and control means are adapted to control the temperature of the surface of the vessel. This laminated structure is considered preferable; however, it is contemplated that other structures may be used. For example, the heater element need not be a laminated structure. Rather, the heater element may comprise merely a layer of conductive fibers. This structure of the heater element is particularly useful if the material into which the heater element is embedded has dielectric properties that will evenly distribute the heat generated by the element.

The preferred heater element is available under the trademark Thermion™, which is manufactured by Aerospace Safety Technologies, Inc. Thermion™ is thin, light, flexible and may be translucent. The material is a laminate that provides even heating and can be conformed to surfaces having a variety of different contours and shapes. Operational power can be derived from low or high voltage AC or DC power supplies.

As discussed above, the heater element may comprise a layer of conductive fibers that are directly embedded into the material. However, in this instance, the material must possess sufficient dielectric properties to evenly distribute the heat generated by the fibers to the surface of the material. Thermoplastic materials typically possess these properties.

The heater element is disposed at a predetermined location and depth in the material. The depth and location may vary according to the particular material and type of heating required.

1. Residential/Commercial Building Use

The thin, unobtrusive nature of the heater element makes it suitable for use in ceramic and marble tile, solid surface materials, Formica, linoleum, and any other floor, wall, roof, or counter covering available. The essential steps of the method of the present invention can be performed in several different ways.

Figure 1:
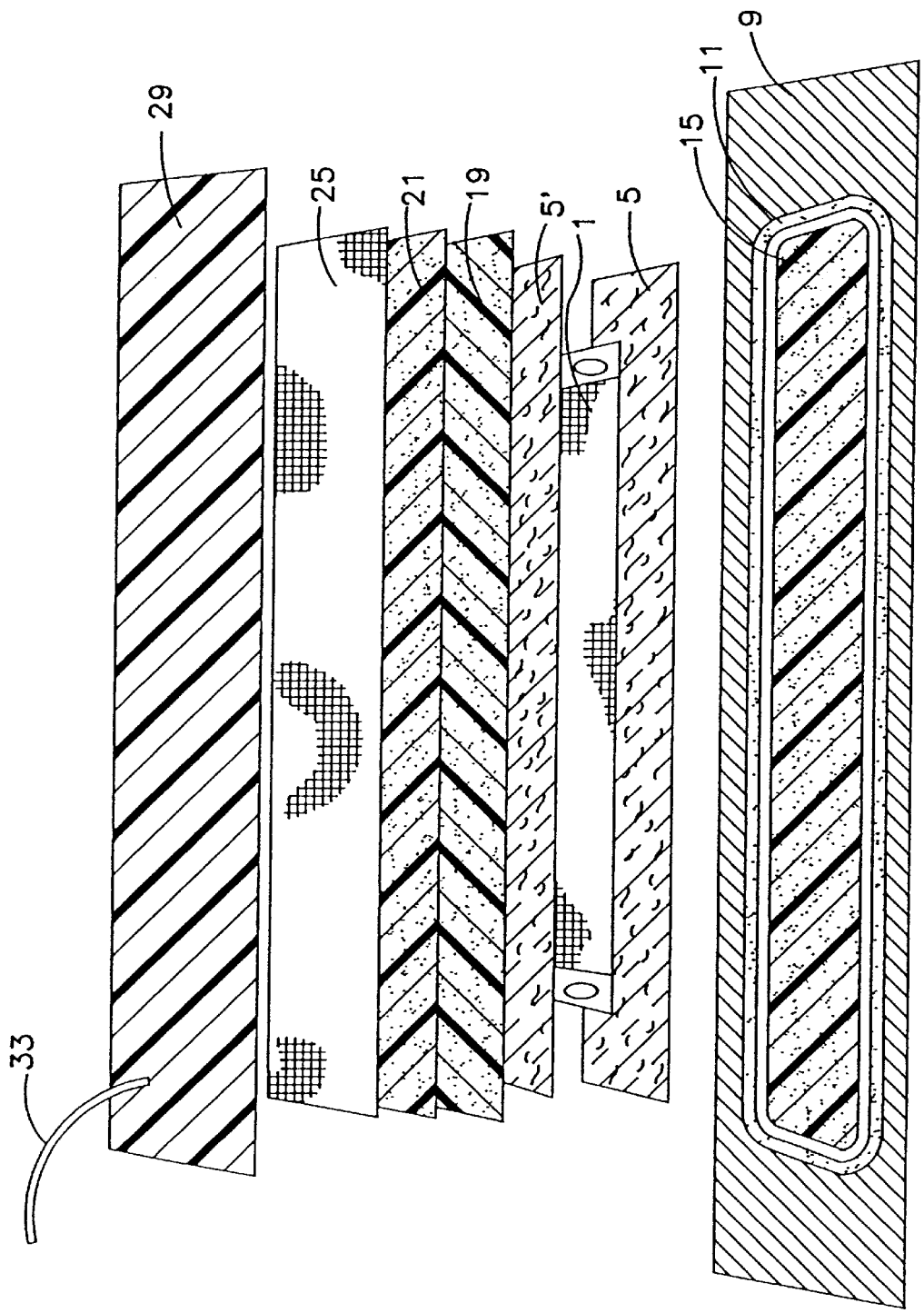
FIG. 1 depicts the construction of a composite heater element of the invention in a mold.

A first variation in the method involves installing in the surface a pre-made panel, usually configured on a mold table for easy transfer to the final surface. As shown in FIG. 1, the pre-made panel comprises a fiberglass resin encapsulated heater element 1, further encapsulated in two fiberglass/resin cloths 5 and 5'. The pre-made panel also contains electrical leads attached to the heater element (not shown). The electrical leads extend outside of the panel and are attached to an electrical power supply. The laminate optionally can be constructed with multiple layers of the fiberglass resin encapsulated heater element 1. The multiple-layered heater element can provide greater control over the heat output from the assembly.

FIG. 1 shows how a single layer pre-made panel is formed on a transfer table. The fiberglass resin encapsulated heater element 1 is placed on top of a mold table surface 9. A mold release wax 15 is disposed between the encapsulated heater element 1 and the table surface 9. A peel ply 19 is placed above the encapsulated heater element 1. A release ply 21 is disposed above the peel ply 19 and a bleeder cloth 25 is disposed over the release ply 21. Finally, a vacuum bag 29 is disposed over the release ply 21. A seal tape 11 surrounding the layers on the mold is attached to the table top surface 9, and can adhere to the vacuum bag 29 to create a tight seal. A vacuum supply 33 is used to evacuate the air between the layered material in order to bring the layers into close contact with each other and cure the resin, bonding the layers to create the laminate.

Figure 2:
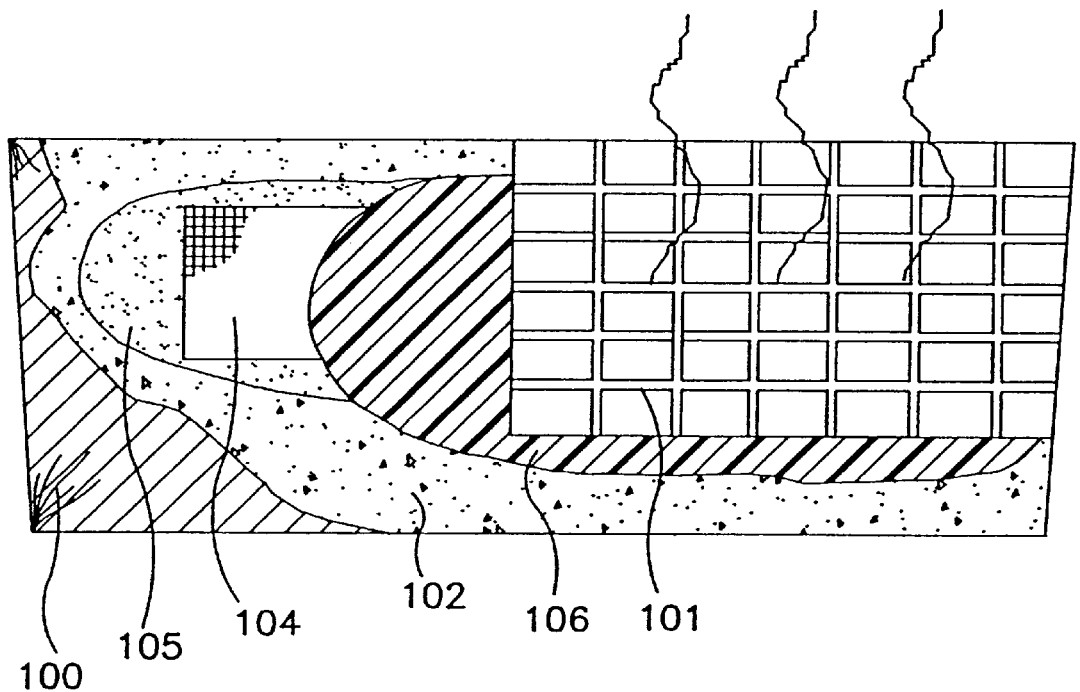
FIG. 2 depicts a typical tile/paver floor containing the heater element as described in the present invention.

Referring to FIG. 2, a pre-formed panel may be installed below a variety of covering surfaces, such as ceramic, marble, or similar paver tiles. In a tile and grout environment 101, the sub-base, whether a floor or countertop, may first be covered by a particle board underlayment 100. Some builders choose not to use an underlayment, but its purpose is to aid in leveling the floor and build uniformity. A vapor barrier and one or more concrete base products are then applied over the underlayment set. At a minimum, the concrete 102 should be at least ½ inch thick for standard wet/dry environments, such as kitchen and bathroom floors and counters (see FIGS. 2 and 3). For standing water conditions, such as showers and exterior areas, the layer must be at least twice this thickness. Concrete serves a dual purpose. It limits the surface flexing and also acts as a water barrier. The vapor barrier further prevents water from passing to the wood below either by sweating or cracking of the concrete. A heater element 104 is disposed above the concrete base 102. The heater element 104 optionally contains a syntactic film layer 106 on the back/bottom side for bonding the element 104 to the concrete base 102. Film layer 106 replaces the mastic that would otherwise be required to set heater element 104 in place. Without a bonding film layer, the installer would smear the concrete base with a thin layer of mastic, alternatively referred to as 105, apply the heater element from edge to edge, minimizing air pockets, and roll the element flat against the concrete base 102. Once the heater element 104 is set, the normal process of installing tiles 101 can continue. If necessary, the panel may be punched with suitable tools to create holes or other shapes, as needed, and edge finished to protect against electrical shock. The holes, depending on their relative size and location, will have minimal to moderate effect on the heat output of the device.

Figure 3:
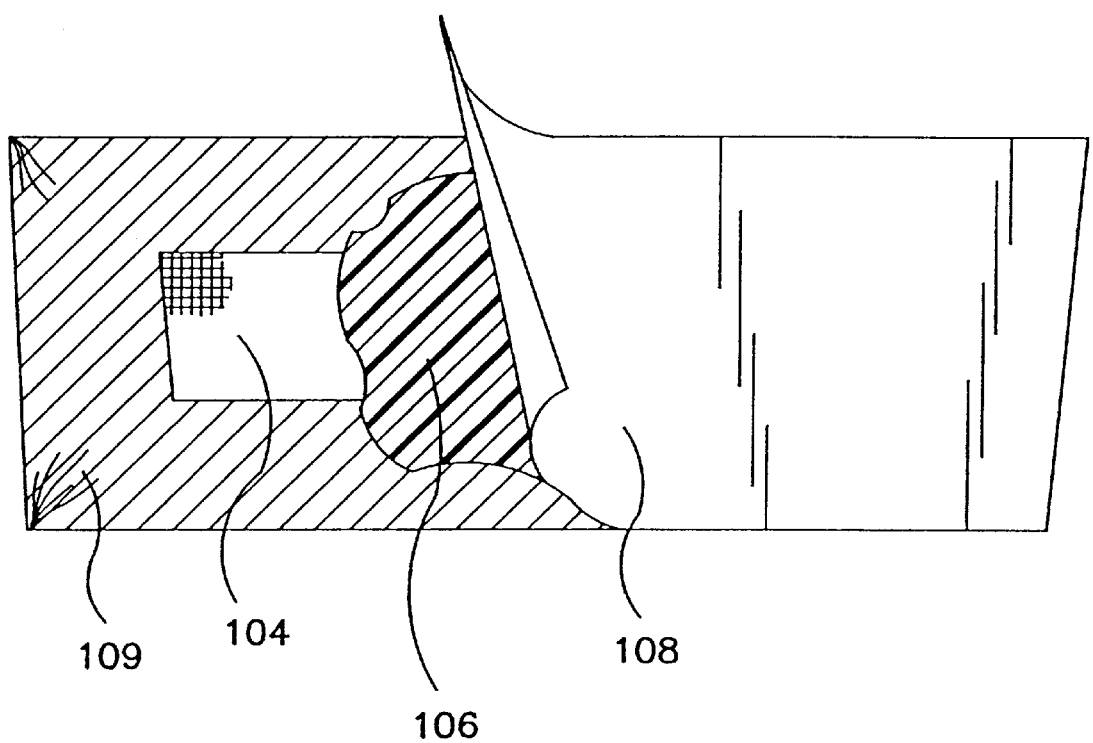
FIG. 3 depicts a Formica™ counter top containing the heater element as described in the present invention.

As depicted in FIG. 3, the heater element 104 can be installed under a countertop layer 108, such as a Formica or linoleum top layer, in a manner similar to tile, although the concrete base and vapor barrier are no longer required. In addition, Formica/linoleum installation generally utilizes contact adhesives which require additional processing known to those skilled in the art.

A second variation in the method of the present invention involves simultaneously constructing the composite heater element 104 at the time the floor, wall, roof, or countertop material is constructed. For instance, the composite in FIG. 3 may be constructed on the sub-surface 109 simultaneously as the other layers of material are applied over the heater element 104. This second method is particularly useful in the construction of formica and metal countertops. This method is advantageous in that custom-shaped heater elements may be easily incorporated below the finished surface of the material. For example, in the case of wood/concrete substrates, custom-shaped heater elements may be bonded under the finished surface of the material. In carrying out this method, the heater element is disposed on a solid, clean surface, and epoxy resin is applied to bond the element to the material. The composite may also be vacuum cured and heated, if desired. The vacuum process regulates the heater resin content in conjunction with the fiberglass selected. After the curing process is complete, the top surface of the material may be finished, as desired. In the case of Formica, a contact adhesive is applied between the element and the top surface before they are joined. Thereafter, the composite is rolled to complete the process.

Figure 4:
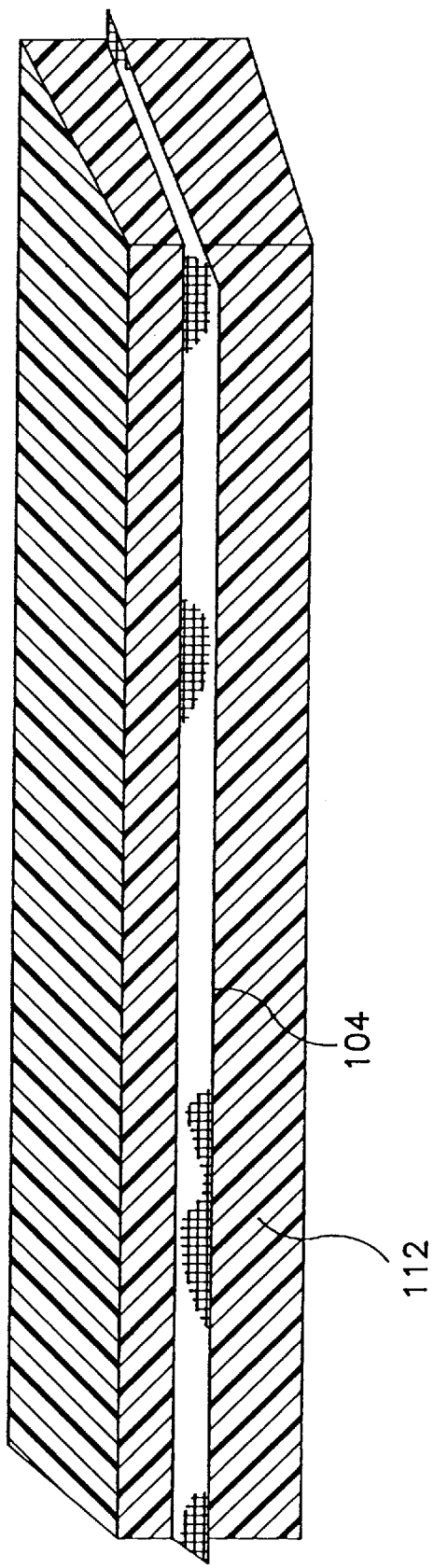
FIG. 4 depicts a typical heater element of the present invention embedded within a solid surface material.

As depicted in FIG. 4, a third variation in the method of the present invention involves providing a heater element 104 without the fiberglass outer layers or resin and encapsulating the element 104 within the finished material at the factory/production level. Such an installation is suitable for solid surface 112 materials such as Corion®, or any other thermoplastic formed item that has sufficient dielectric strength to isolate the electric heater element from the surface, and that allows cohesive bonding through the heating element. Most structures developed by liquid process molding are excellent candidates. The placement of the heater element 104 can be accurately controlled providing heat as near to the surface as is practical and safe. Using standard counter depths, the heaters can be pre-formed to run front to back allowing the surface to be cut to length, and end finished. A front to back orientation refers to the direction of current flow.

Different configurations of heater placement and orientation may be accomplished at the time of production, allowing for custom needs. Some circumstances may require surface heating in localized areas, for instance, the areas around a sink or other fixtures. The heater element may, therefore, be precut to any particular pattern and may contain holes or cuts, as is necessary. For a field modification to a solid surface application, the surface could be cored within certain dimensions and edge finished, having minimal to moderate effect on the heater's performance.

Figure 5:
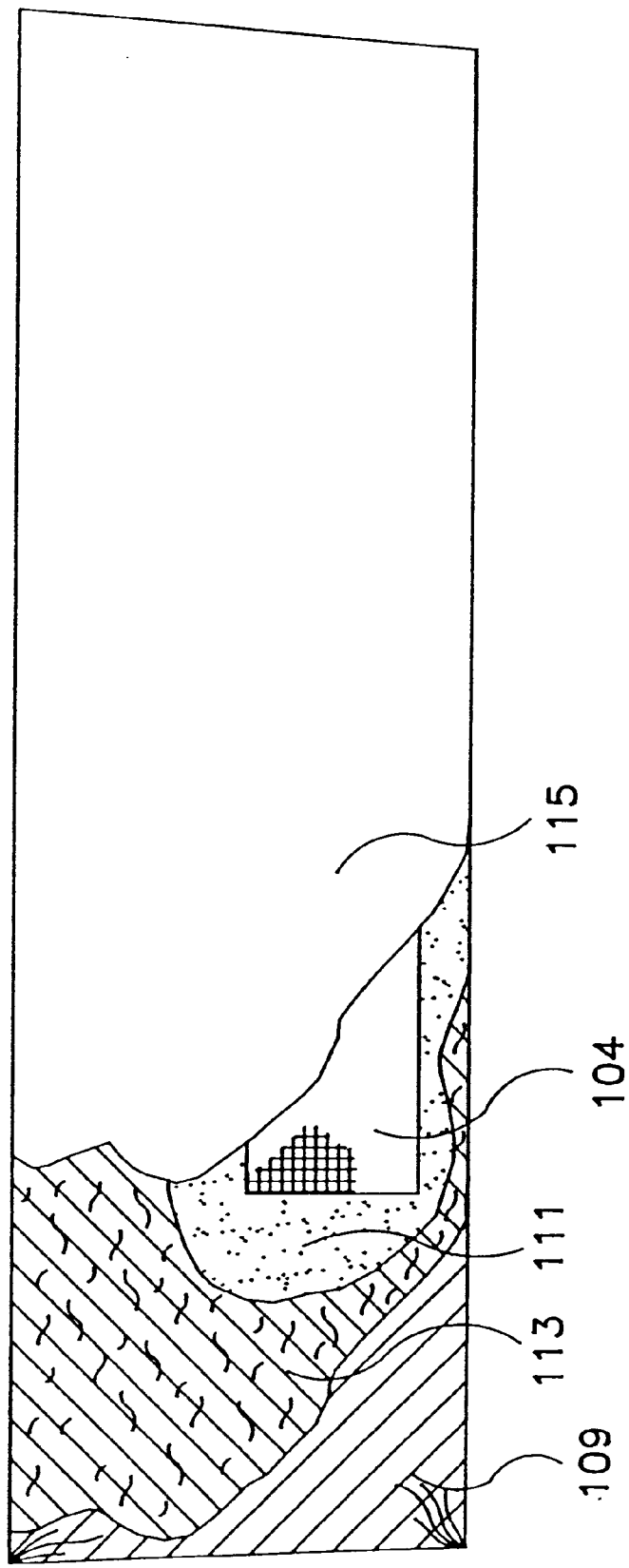
FIG. 5 depicts a roof ice dam heater of the present invention.
Figure 6:
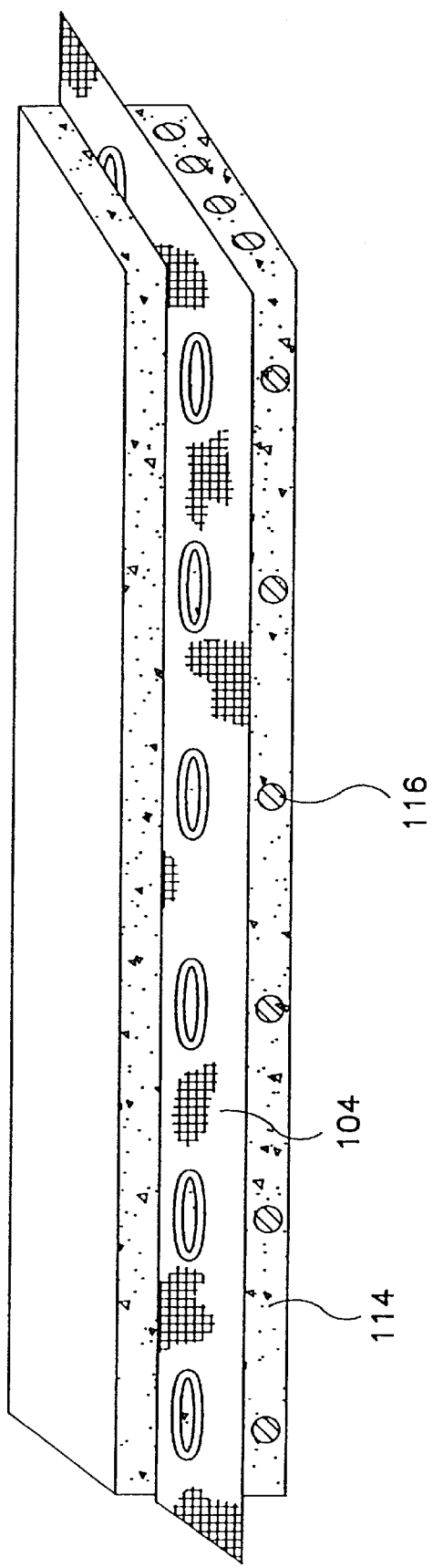
FIG. 6 depicts a typical inlaid concrete walkway containing a heater element as described in the present invention.

Additional residential/commercial building applications include roof de-icing as shown in FIG. 5 and concrete walkways as shown in FIG. 6. These applications could use the pre-made panels for convenience and quick installation. Such roof applications are suitable for neoprene, hot mopped, shingled or even metal style roofs. FIG. 5 shows a typical application of the heater element 104 to a roof. Listed from bottom layer to top layer, the typical heater roof comprises a wood sheeting substrate 109, felt paper 113, heater mastic 111, the heater element 104, and the finished roof layer 115. The finished roof layer 115 may be of typical roof finish materials such as, neoprene rubber, metal, or the like.

Application of the heater element in a concrete walkway is depicted in FIG. 6. The walkway contains a perforated panel 114, laid during construction over and above, or in place of, a remesh/rebar 116. The heater element 104 is disposed over the perforated panel 114. Finally, a top layer of concrete is disposed above the element.

The heater element may also be applied to rain gutters. Such application may be completed by use of any of the methods discussed. The particular method chosen depends on the installation and gutter product selected.

Additionally, the heater element may be applied to mirrors. Mirror application to prevent fogging is an example of a simple back side bonding. The heater may be a pre-formed panel or a formed-in-place installation. For radiant heat applications the methods are no different only the object selected to encase the material vary. Besides the possibility of heated pavers, diffused panels for a green house can incorporate the heated panels. The panels can be of simple or complex design and may provide winter environmental control and snow removal. Additional greenhouse installations could provide local heating as well for particular applications, such as lighting pairs for ice/snow protection and for heating/environmental control.

What is claimed is:

1. A method for heating the surface of a roof, comprising;

providing a pre-formed panel heater element to the roof, wherein said pre-formed panel heater element consists of an inner layer composed of a fabric of electrically conductive fibers encapsulated between two fiberglass/resin layers; two outer fiberglass/resin layers disposed on opposing surfaces of said inner layer and encapsulating said inner layer; and electrical leads connected to said conductive fibers and adapted to receive power from a power source;

disposing the pre-formed panel heater element at a pre-determined depth in the roof; and energizing the conductive fibers of the pre-formed panel heater element at prescribed intervals and temperatures which are effective to distribute heat evenly on the surface of the roof.

2. The method of claim 1, wherein the roof surface comprises a finished roof layer comprising a material selected from the group consisting of neoprene rubber, metal, shingled and hot mopped.

* * * * *

UNITED STATES PATENT AND TRADEMARK OFFICE
CERTIFICATE OF CORRECTION

PATENT NO.    : 6,124,571
DATED         : September 26, 2000
INVENTOR(S)   : Miller et al.

Page 1 of 1

It is certified that error appears in the above-identified patent and that said Letters Patent is hereby corrected as shown below:

<u>Title page,</u>
Item [73], Assignee: insert
-- [73] Assignee: Thermion Systems International --, and
After "Assistant Examiner" insert -- *Attorney, Agent or Firm–* White & Case LLP --.

Signed and Sealed this

Tenth Day of December, 2002

JAMES E. ROGAN
*Director of the United States Patent and Trademark Office*